US012775748B2

United States Patent
(12) United States Patent
Tramoni et al.

(10) Patent No.: US 12,775,748 B2
(45) Date of Patent: Oct. 27, 2026

(54) EMBEDDED SECURE CIRCUIT

(71) Applicant: STMicroelectronics International N.V., Geneva (CH)

(72) Inventors: Alexandre Tramoni, Le Beausset (FR); Fabrice Romain, Rians (FR)

(73) Assignee: STMicroelectronics International N.V., Geneva (CH)

(*) Notice: Subject to any disclaimer, the term of this patent is extended or adjusted under 35 U.S.C. 154(b) by 66 days.

(21) Appl. No.: 18/420,024

(22) Filed: Jan. 23, 2024

(65) Prior Publication Data

US 2024/0265152 A1 Aug. 8, 2024

(30) Foreign Application Priority Data

Feb. 8, 2023 (EP) .................................... 23305166
Apr. 28, 2023 (FR) .................................... 2304326

(51) Int. Cl.
*G06F 21/71* (2013.01)

(52) U.S. Cl.
CPC .................................... *G06F 21/71* (2013.01)

(58) Field of Classification Search
CPC .................................... G06F 21/71
See application file for complete search history.

(56) References Cited

U.S. PATENT DOCUMENTS 8,209,550 B2 * 6/2012 Gehrmann .............. G06F 21/71 713/193
8,898,769 B2 * 11/2014 Chastain .............. G06F 21/6227 726/17
10,015,665 B2 * 7/2018 Chastain .............. G06F 21/79
10,157,281 B2 * 12/2018 Van Nieuwenhuyze .............. G06F 21/81
10,529,157 B2 * 1/2020 Menard .............. G07C 9/00857
10,878,113 B2 * 12/2020 Benson .............. G06F 21/12
11,086,999 B2 * 8/2021 Van Nieuwenhuyze .............. G06F 21/575
11,140,622 B2 * 10/2021 Jalkanen .............. H04W 8/18
11,301,554 B2 * 4/2022 Law .............. G06F 21/34
11,768,968 B2 * 9/2023 Van Nieuwenhuyze .............. G06F 21/575 726/26
11,822,664 B2 * 11/2023 Kovah .............. H04L 63/0823
11,853,740 B2 * 12/2023 Dao .............. H04L 67/34
2015/0067351 A1 * 3/2015 Wang .............. H04W 12/082 713/189
2015/0181621 A1 6/2015 Levy et al.
2018/0268132 A1 9/2018 Buer et al.
2019/0097794 A1 * 3/2019 Nix .............. G06F 21/33
2019/0174449 A1 * 6/2019 Shan .............. H04W 60/04
2020/0137034 A1 * 4/2020 Di Cosmo .............. H04W 12/08
2021/0073425 A1 * 3/2021 Veneroso .............. G06F 13/362
2021/0390214 A1 * 12/2021 Van Nieuwenhuyze .............. G06F 21/64

(Continued)

FOREIGN PATENT DOCUMENTS

EP 1550341 B1 1/2007
EP 3133852 A1 2/2017

OTHER PUBLICATIONS

Peter, Matthias et al., "A Proposal for Functionality Classes for Random Number Generators", Version 2.35—Draft, Sep. 2, 2022, 239 pages.

*Primary Examiner* — Viral S Lakhia
(74) *Attorney, Agent, or Firm* — Slater Matsil, LLP

(57) ABSTRACT

The present description concerns an integrated circuit comprising at least two secure circuits having similar functions but respecting or complying with different security schemes.

18 Claims, 2 Drawing Sheets

(56) References Cited

U.S. PATENT DOCUMENTS

| | | | | |
|---|---|---|---|---|
| 2021/0397716 | A1* | 12/2021 | Kovah | H04L 9/3263 |
| 2022/0353062 | A1* | 11/2022 | Hsiao | H04L 9/0841 |

* cited by examiner

EMBEDDED SECURE CIRCUIT

CROSS-REFERENCE TO RELATED APPLICATIONS

The present disclosure claims priority to the disclosures of European patent application No 23305166.3 filed on Feb. 8, 2023 and of French patent application No 23/04326 filed on Apr. 28, 2023, the contents of both of which are hereby incorporated herein by reference.

TECHNICAL FIELD

UICC cards and SIM cards are historically formed of electronic micro-cards supporting an integrated circuit chip and contacts of connection to elements of an electronic device, for example a telephone, into which the card is inserted. These cards guarantee the integrity and the security of data that they contain, generally personal data of the user. They are sometimes referred to as physical cards, pSIM or pUICC (p for physical).

BACKGROUND

UICC card and SIM cards are historically formed of electronic micro-cards supporting an integrated circuit chip and contacts of connection to elements of an electronic device, for example a telephone, into which the card is inserted. These cards guarantee the integrity and the security of data that they contain, generally personal data of the user. They are sometimes referred to as physical cards, pSIM or pUICC (p for physical).

Embedded universal integrated circuit cards (eUICC) tend to replace universal integrated circuit cards. An embedded universal integrated circuit card consists of an integrated circuit directly placed on an electronic card of a device or integrated in a system on chip (SoC). An eUICC circuit generally integrates a subscriber identification module.

The applications of subscriber identification modules and more generally of UICCs are often linked to telecommunication networks and more particularly to mobile telephony operators. These operators generally impose features which are specific thereto to certify, that is, authorize on their networks, a circuit integrating a universal integrated circuit card.

This dependency leads to dedicating production models to given markets, for example to countries or to groups of countries.

SUMMARY

There exists a need to improve embedded universal integrated circuit cards (eUICC).

An embodiment overcomes all or part of the disadvantages of known eUICC circuits.

An embodiment provides a solution to make a same platform or system on chip compatible with different telecommunication networks.

More particularly, an embodiment provides an integrated circuit comprising at least two secure circuits having similar functions but respecting or complying with different security schemes.

According to an embodiment, each secure circuit is configured for a given certification authority.

According to an embodiment, each secure circuit is configured according to a geographical area.

According to an embodiment, the integrated circuit comprises one or a plurality of communication buses accessible to the secure circuits via a selector having a control terminal coupled to a terminal of the integrated circuit.

According to an embodiment, the integrated circuit comprises elements shared between the two secure circuits.

According to an embodiment, the integrated circuit comprises communication and input/output circuits accessible to the two secure circuits.

According to an embodiment, the integrated circuit comprises one or a plurality of power management units accessible to the two secure circuits.

According to an embodiment, the integrated circuit comprises one or a plurality of clock generation circuits accessible to the two secure circuits.

According to an embodiment, a selection between one or the other of the secure circuits is performed by a software control originating from the outside of the integrated circuit.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF EMBODIMENTS

Figure 1:
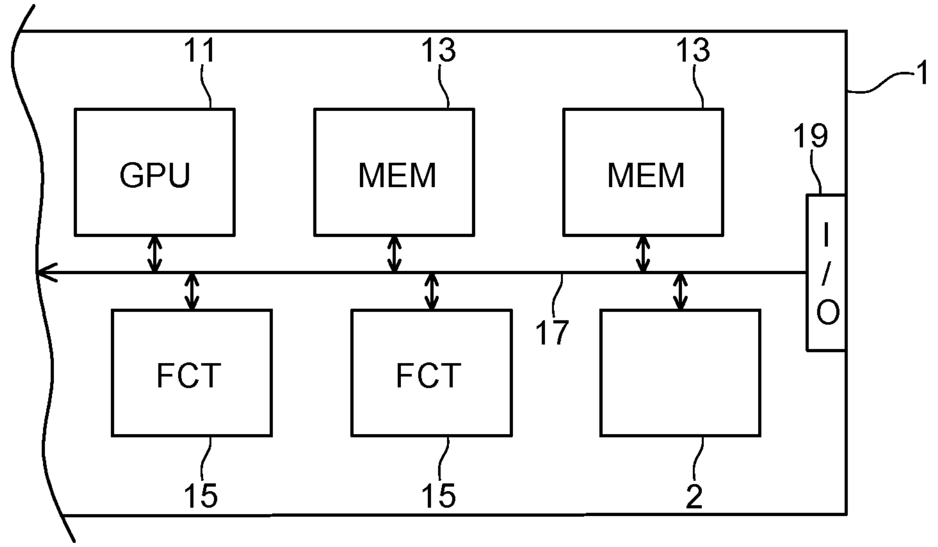
FIG. 1 schematically shows in the form of blocks an example of an electronic card equipped with an embedded secure element.

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the exchanges between an eUICC and the other components of the device integrating this eUICC or the outside of the device have not been described in detail, the described embodiments being compatible with usual solutions.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms “edge”, “back”, “top”, “bottom”, “left”, “right”, etc., or relative positions, such as terms “above”, “under”, “upper”, “lower”, etc., or to terms qualifying directions, such as terms “horizontal”, “vertical”, etc., it is referred, unless specified otherwise, to the orientation of the drawings.

Unless specified otherwise, the expressions “about”, “approximately”, “substantially”, and “in the order of” signify plus or minus 10%, preferably of plus or minus 5%.

The example of an embedded universal integrated circuit card (eUICC) will be taken hereafter but it should be noted that the described solution more generally applies to any secure circuit integrating security or identification elements such as an embedded secure element (eSE) in applications where similar problems are posed.

Conventionally, a secure circuit, typically an eUICC circuit, is dedicated to a given certification authority, that is, in the case of an eSIM, to a telephone network operator or a group of operators of a geographical area (a country or group of countries). This certification authority imposes functional and security features which are specific thereto and which are not necessarily the same as those of another certification authority.

To enable a same telecommunication device, typically a cell phone, to be compatible with a plurality of operators or a plurality of certification authorities, this phone has to comprise two universal integrated circuit cards (UICC), for example two physical subscriber identification modules (SIM cards). Indeed, operators refuse to share their secure functionalities with other operators. Now, telephone manufacturers desire for a given telephone model to be able to be used with any operator.

With physical SIM cards, it is sufficient to change the SIM card in the phone to pass from one compatibility to another. The development of embedded secure elements however makes this solution inapplicable.

It could be devised to provide, on the phone manufacturer side, two (or a plurality of) different platforms, that is, two complete electronic environments, respectively dedicated to different operators. On manufacturing, according to the operator for which the system is intended, the manufacturer selects the platform to be integrated in the phone. This complicates the manufacturing by imposing two stock keeping units (SKU) per phone model.

It could be devised to equip each phone with two embedded secure elements respectively dedicated to one or the other of the certification authorities (one or the other of the markets) welded on the electronic card of the phone. However, this increases the cost by imposing two complete secure elements.

A mixed solution could be envisaged, that is, manufacture the phones according to a platform corresponding to a certification authority and provide a location (slot) for a physical SIM card (a pUICC) enabling to make it compatible with another certification authority. This however imposes keeping a SIM card location in the phone while the current tendency is to suppress them.

According to the described embodiments, it is provided to form a single embedded security element, or embedded universal integrated circuit card, in the form of an integrated circuit, which is configurable according to the certification authority for which the phone is intended.

FIG. 1 schematically shows in the form of blocks an example of an electronic system (for example an electronic card or a system on chip) of the type to which the described embodiments apply.

The electronic system 1 of FIG. 1 comprises, in this example:

- a general microcontroller or microprocessor 11 (GPU);
- memories 13 (MEM), volatile and non-volatile;
- various circuits 15 (FCT) responding to the functions required for the operation of the device (of the phone), for example a NFC controller, a graphic circuit, an audio circuit, etc.; and
- one or a plurality of buses 17 of communication (data, address, and control) of the circuits of system 1 with one another or with the outside via input/output interfaces 19 (I/O).

The system also comprises an integrated circuit 2, which forms an embedded security element or embedded universal integrated circuit card (eUICC). Circuit 2 communicates with all or part of the other circuits of system 1 via bus 17.

A system 1 such as illustrated in FIG. 1 is usual per se and will thus not be detailed any further.

According to the described embodiments, it is provided to equip system 1 with an embedded security element or integrated circuit 2 having a specific structure.

Figure 2:
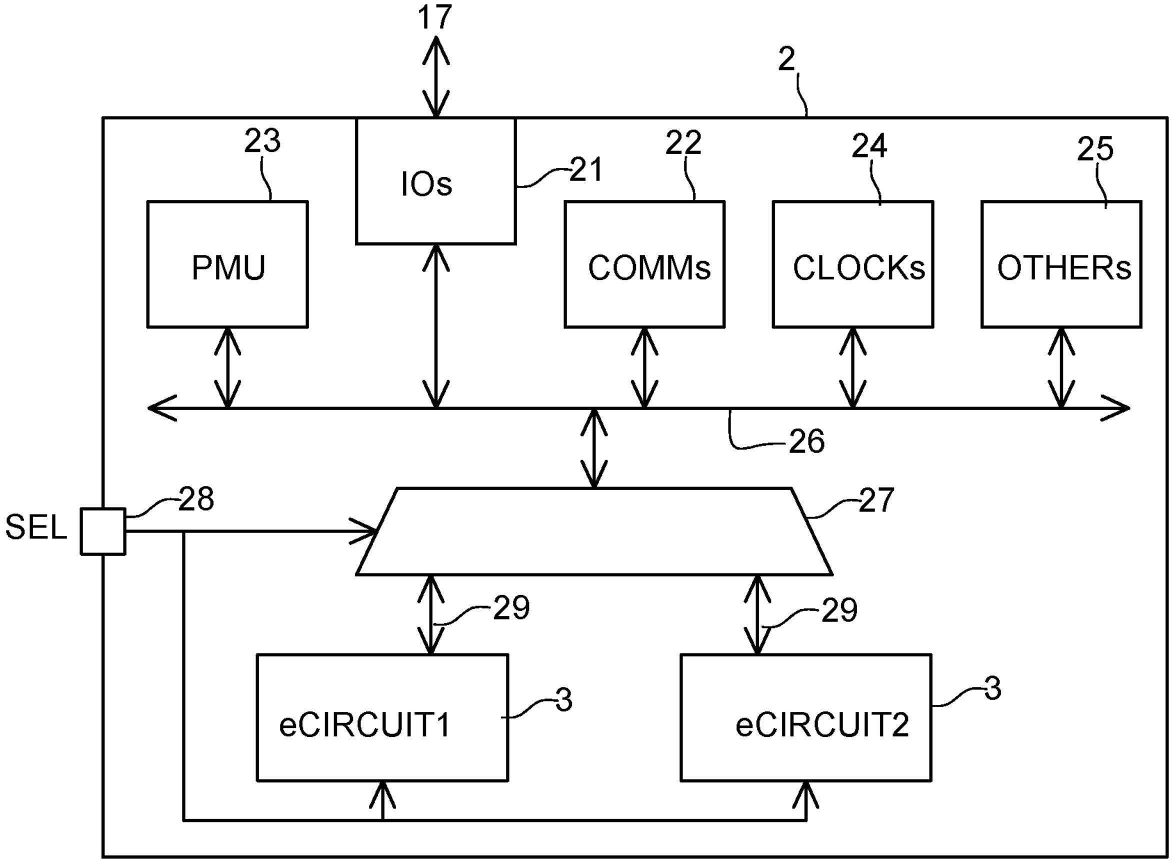
FIG. 2 schematically shows in the form of blocks an embodiment of an integrated circuit.

FIG. 2 schematically shows in the form of blocks an embodiment of an embedded secure circuit 2.

According to this embodiment, circuit 2 integrates two secure circuit systems having similar functions but respecting or complying with different security schemes.

By different security schemes, there is meant that the circuits 3 which are integrated in the same embedded security element (eSE) or the same embedded universal integrated circuit card (eUICC) 2 are designed to respect or comply with the features required by different certification authorities.

An integrated circuit 2 according to the described embodiments thus comprises elements or circuits 3 (eCIRCUIT1, eCIRCUIT2) dedicated to different secure environments (different certification authorities) and elements or circuits shared between these circuits 3.

More precisely, embedded security element 2 integrates, among others and usually:

- one or a plurality of input/output interfaces 21 (IOs) for communicating with the other circuits of system 1 (FIG. 1) via buses 17;
- one or a plurality of communication circuits 22 (COMMs);
- a power management unit 23 (PMU);
- one or a plurality of synchronization or clock circuits 24 (CLOCKs);
- one or a plurality of other circuits 25 (OTHERs) according to the functionalities expected for integrated circuit 2 and corresponding to functions shareable independently from the operator or from the certification authority; and
- one or a plurality of buses 26 of communication of the elements with one another and with the input/output interfaces.

According to the embodiment of FIG. 2, it is provided to integrate, in secure element 2, two circuits 3 (eCIRCUIT1, eCIRCUIT2) containing the non-shareable functions of the embedded security element. In other words, these are functions dedicated to each operator or each certification authority.

Each circuit 3 is coupled, by one or a plurality of buses 29 which are specific thereto, to buses 26 via a selector 27 assigning the connection with buses 26, and thus with the other components of circuit 2, to one or the other of circuits 3. Selector 27 is controlled by a selection signal SEL, originating from the outside of circuit 2, by a dedicated terminal or port 28.

According to an embodiment, signal SEL is delivered by the microcontroller 11 of system 1 according to the geographical region where the phone is located.

According to another embodiment, the state of the selection signal is stored in a non-volatile memory, read by microcontroller 11 at each starting of the phone.

Terminal 28 is preferably also directly connected to circuits 3. This enables, at the starting, the two circuits to be activated and then, according to the state of signal Sel, one of them to set to standby and/or to deactivate and the other one to remain active.

Figure 3:
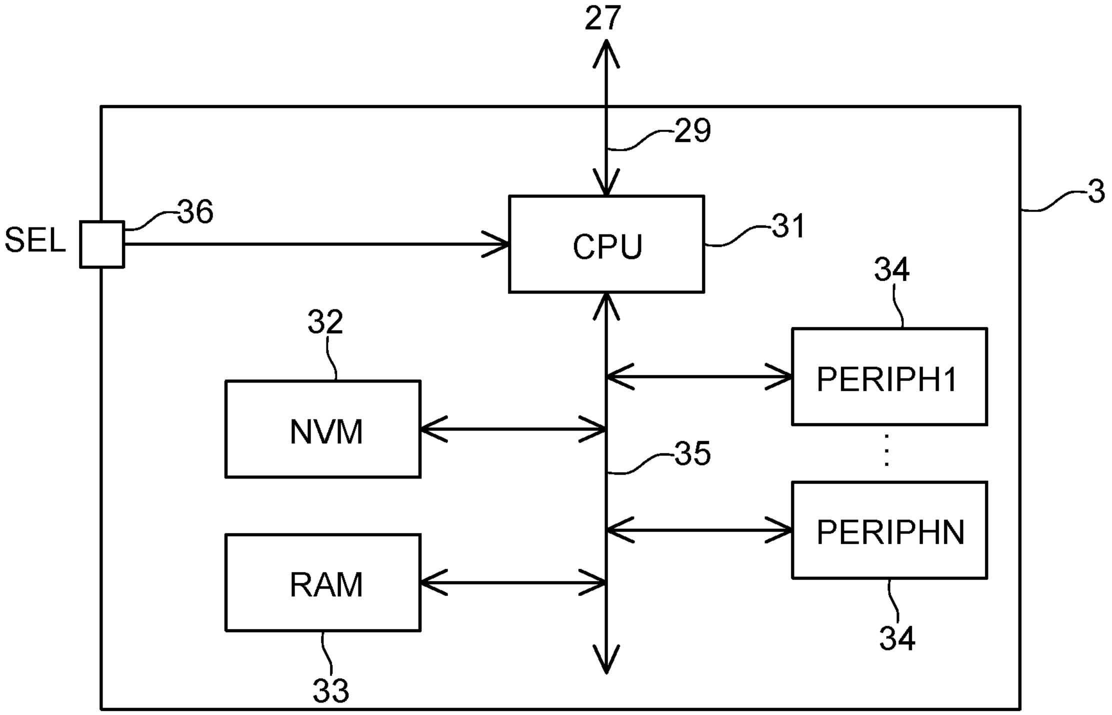
FIG. 3 schematically shows in the form of blocks an embodiment of a secure circuit integrated in the circuit of FIG. 2.

FIG. 3 schematically shows in the form of blocks an embodiment of a secure circuit 3, integrated in the circuit of FIG. 2.

A circuit 3 comprises, according to this example:

a processing unit 31 or microprocessor (CPU);

one or a plurality of non-volatile memories 32 (NVM);

one or a plurality of volatile memories 33 (RAM);

one or a plurality of circuits 34 (PERIPH1, . . . , PERIPHN) or peripherals of unit 31, dedicated to the features required by the certification authority; and one or a plurality of buses 35 of communication between the different components of circuit 3.

Unit 31 is coupled by bus 29 to selector 27 (FIG. 2) and receives, via a dedicated port 36, signal SEL.

Each circuit system 3 comprises the elements and functions required to address the security constraints which are specific thereto, independently from (without requiring) the other circuit system 3 of circuit 2, to implement the required functionalities.

Preferably, circuit 2 comprises two and only two dedicated circuit systems 3. This enables a simple selection via the selector by a two-state signal SEL.

It should be noted that the components of circuits 2 and 3, except for selector 27, are usual per se be it in terms of structure or of functionalities. Indeed, the described embodiments distribute, within embedded secure element 2, the shareable components between a plurality of certification authorities and the components which are dedicated to such or such certification authority, but remain compatible with a usual operation.

For the phone manufacturer, the described solutions enable to keep the same hardware and software platform for a given phone architecture (a given model), independently from the market (from the operator) for which this phone is intended.

For the operator, this respects or complies with the security constraints of the certification authority to which it belongs since, once the circuit 3 which is dedicated thereto has been selected, everything occurs as if circuit 2 formed an embedded security element dedicated to this authority.

A specific example of application of the described solution concerns the forming of an eUICC shared between certifications known under denominations OSCCA and CC. Typically, a telephony certification according to the CC (common Criteria) features cannot be obtained if the secure circuit system or the programs which are executed therein are shared with another certification authority. Further, an OSCCA certification requires the uploading of a specific cipher algorithm different from that used by a CC certification.

The above example may also correspond to geographical areas. Indeed, the OSCCA certification more particularly corresponds to the Chinese market while other countries or regions in the world share another certification.

Insulating in dedicated circuits 3 or circuit systems the elements corresponding to the dedicated certification features enables a same secure circuit 2 to be able to obtain the certifications of a plurality of environments, for example OSCCA and CC as mentioned hereabove. However, all the components of the embedded secure element which are shareable are common to the two environments, which is a gain in terms of bulk and of cost.

It should be noted that selector 27 is a hardware selector and not a software selector to guarantee an absence of operation of circuit 2 with the two secure circuits 3 simultaneously. The hardware selector may optionally, be software-controlled via port 28 but this software is then hosted by a circuit external to circuit 2 to preserve the areas certified by the certification authorities of secure circuits 3.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove.

The invention claimed is:

1. An integrated circuit comprising:

at least two secure circuits having similar functions but each secure circuit complying with a different, from a remainder of the secure circuits, telecommunication network certification authority for a telecommunication network operated by a mobile telephony operator, wherein each secure circuit comprises:

at least one secure circuit communication bus;

at least one non-volatile memory coupled to the at least one secure circuit communication bus;

at least one volatile memory coupled to the at least one secure circuit communication bus;

at least one peripheral circuit, dedicated to features required by a respective certification authority, coupled to the at least one secure circuit communication bus; and a microprocessor communicatively coupled, via the at least one secure circuit communication bus, to the at least one non-volatile memory, the at least one volatile memory, and the at least one peripheral circuit; and a hardware selector comprising:

a control terminal coupled to a terminal of the integrated circuit;

at least two inputs, each input coupled to a respective one of the at least two secure circuits; and an output coupled to other circuits of the integrated circuit.

2. The integrated circuit according to claim 1, wherein each secure circuit is dedicated to a respective certification authority.

3. The integrated circuit according to claim 1, wherein each secure circuit is configured according to a geographical area.

4. The integrated circuit according to claim 1, further comprising: one or more communication buses accessible to the at least two secure circuits via the selector.

5. The integrated circuit according to claim 1, wherein the other circuits are shared between the at least two secure circuits.

6. The integrated circuit according to claim 1, further comprising communication and input/output circuits accessible to the at least two secure circuits.

7. The integrated circuit according to claim 1, further comprising one or more power management units accessible to the at least two secure circuits.

8. The integrated circuit according to claim 1, further comprising one or more clock generation circuits accessible to the at least two secure circuits.

9. The integrated circuit according to claim 1, wherein the integrated circuit is configured to select one of the at least two secure circuits in accordance with a software control originating from outside of the integrated circuit.

10. An electronic system comprising:

at least one communication bus;

at least one memory coupled to the at least one communication bus;

at least one input/output interface coupled to the at least one communication bus;

an integrated circuit coupled to the at least one communication bus, and comprising:

at least two secure circuits having similar functions but each secure circuit complying with a different, from a remainder of the secure circuits, telecommunication network certification authority for a telecommunication network operated by a mobile telephony operator, wherein each secure circuit comprises:

at least one secure circuit communication bus;

at least one non-volatile memory coupled to the at least one secure circuit communication bus;

at least one volatile memory coupled to the at least one secure circuit communication bus;

at least one peripheral circuit, dedicated to features required by a respective certification authority, coupled to the at least one secure circuit communication bus; and a microprocessor communicatively coupled, via the at least one secure circuit communication bus, to the at least one non-volatile memory, the at least one volatile memory, and the at least one peripheral circuit;

a hardware selector comprising:

a control terminal coupled to a terminal of the integrated circuit;

at least two inputs, each input coupled to a respective one of the at least two secure circuits; and an output coupled to other circuits of the integrated circuit; and a microcontroller communicatively coupled, via the at least one communication bus, to the at least one memory, the at least one input/output interface, and the integrated circuit.

11. The electronic system according to claim 10, wherein each secure circuit is dedicated to a respective certification authority.

12. The electronic system according to claim 10, wherein each secure circuit is configured according to a geographical area.

13. The electronic system according to claim 10, wherein the integrated circuit further comprises: one or more communication buses accessible to the at least two secure circuits via the selector.

14. The electronic system according to claim 10, wherein the other circuits are shared between the at least two secure circuits.

15. The electronic system according to claim 10, wherein the integrated circuit further comprises communication and input/output circuits accessible to the at least two secure circuits.

16. The electronic system according to claim 10, wherein the integrated circuit further comprises one or more power management units accessible to the at least two secure circuits.

17. The electronic system according to claim 10, wherein the integrated circuit further comprises one or more clock generation circuits accessible to the at least two secure circuits.

18. The electronic system according to claim 10, wherein the integrated circuit is configured to select one of the at least two secure circuits in accordance with a software control originating from outside of the integrated circuit.

* * * * *